United States Patent [19]

Boardman

[11] Patent Number: 4,524,955
[45] Date of Patent: Jun. 25, 1985

[54] BURNING TABLE

[75] Inventor: Peter W. Boardman, St. Catharines, Canada

[73] Assignee: Deere & Company, Moline, Ill.

[21] Appl. No.: 618,614

[22] Filed: Jun. 8, 1984

[51] Int. Cl.³ .............................................. B23K 7/00
[52] U.S. Cl. ....................................... 266/49; 266/65
[58] Field of Search .................................. 266/49, 65

[56] References Cited

U.S. PATENT DOCUMENTS

| | | | |
|---|---|---|---|
| 3,743,260 | 7/1973 | Alleman et al. | 266/23 K |
| 3,770,110 | 11/1973 | Boskovitch | 198/220 DA |
| 3,787,247 | 1/1974 | Couch, Jr. | 148/9 R |
| 3,792,846 | 2/1974 | Geffert | 266/23 F |
| 3,941,361 | 3/1976 | Cranston et al. | 269/15 |
| 3,969,132 | 7/1976 | Anderson et al. | 134/18 |
| 4,162,060 | 7/1979 | Anderson et al. | 266/49 |
| 4,220,318 | 9/1980 | Anderson | 266/49 |
| 4,338,507 | 7/1982 | Scott | 266/49 |
| 4,341,374 | 7/1982 | Seelinger | 266/49 |

Primary Examiner—Wayland Stallard

[57] ABSTRACT

A burning table including numerous upright copper support cylinders carried on a load-bearing steel grid to form a horizontal work surface. A high water level provides rapid cooling of the cylinders as the burning tool moves along the surface supported workpiece and eliminates pollution by quickly disintegrating slag. Individual cylinders are reversible in the grid for extended life, and damaged cylinders are easy and inexpensive to replace. The support cylinders are crowded on the grid for complete support of even relatively small parts. A hopper-shaped pan collects slag, and a vibrator causes the slag to move into a collection bin for quick and convenient removal.

28 Claims, 4 Drawing Figures

BURNING TABLE

FIELD OF THE INVENTION

The present invention relates to burning tables and more specifically to such a table having improved workpiece support and slag removal structure.

BACKGROUND OF THE INVENTION

Burning tables having steel supports such as burn bars or standards for supporting a workpiece in generally horizontal fashion above a water tank and adjacent a torch or similar cutting tool are well-known in the art, and examples of such can be found in U.S. Pat. Nos. 4,341,374; 4,162,060; 3,941,361; and 3,792,846. The steel supports are often easily cut along with the workpiece during cutting operations and require relatively frequent and time-consuming as well as expensive replacement. Complicated fume-extracting equipment is generally required to prevent pollution problems. Although these problems have been reduced somewhat by providing readily removable steel supports with a water surface closely adjacent the supporting surface, the burning tables of the prior art still suffer from several disadvantages. Individual replaceable supports are usually quite large and costly. The supports are usually widely spaced so that smaller cut parts fall below the level of the support surface. Gratings located below the water level between the supports are utilized to catch small pieces of falling metal, but these pieces can be difficult to retrieve and can subject the operator to burns if they are retrieved by hand before being properly cooled. Densely packed supports or supports with large cross-sectional areas are not suitable since blowback of the cutting arc with impeded cutting can occur as the cutting tool moves directly over the support.

The slag and other materials which fall from the workpiece being cut must drop through the water and be periodically removed, and numerous devices for cleaning the bottom of the tanks have been devised, including those discussed in U.S. Pat. Nos. 3,969,132 and 3,770,110. Various arrangements of sloped bottoms and floor with flushing structure such as nozzles or selectively opening and closing drain channels have been suggested, but none of these devices has been entirely satisfactory. The close proximity of the tank bottom to the floor prevents use of a steep incline to cause the slag to settle to one end of the tank.

SUMMARY OF THE INVENTION

It is therefore an object of the present invention to provide an improved burning table. It is a further object of the present invention to provide a burning table which overcomes many of the problems associated with prior art burning table structures.

It is another object of the present invention to provide a burning table which has a long-lasting and relatively inexpensive replaceable workpiece supporting structure.

It is still another object of the present invention to provide a burning table which provides for more complete support of all sizes of cut parts than at least most of the previously available tables. It is a further object to provide such a table which also eliminates blowback problems.

It is another object of the present invention to provide a burning table which reduces the pollution from a burning machine without complicated fume-extracting equipment.

It is still a further object of the present invention to provide a burning table with improved structure for collecting slag and for cleaning slag and other material from the bottom of the water tank.

It is another object of the present invention to provide a burning table having a workpiece support structure fabricated from numerous individually reversible and replaceable elements. It is a further object to provide such a table wherein the individual elements are fabricated from common tubing and are substantially smaller and less expensive than at least most previously available replaceable elements.

The burning table constructed in accordance with the teachings of the present invention includes a long-life steel grid supported adjacent the top of a hopper-shaped tank in freestanding fashion for easy removal. Numerous upright copper cylinders or support elements are carried by the steel grid in cutout or castellated areas uniformly spaced along the length and width of the grid. The cylinders, which are fabricated from relatively inexpensive thin-walled copper tubing, extend upwardly from the grid in a compactly spaced pattern to form a crowded material support structure which prevents smaller cut pieces from falling to the grid. The thin cylinder walls prevent blowback problems. The tank is normally filled with water to a level above the level of the grid and slightly below the top of the copper elements so that the elements cool quickly and the slag and other waste material from the cutting operation are quickly received and disintegrate in the water to prevent pollution. The individual copper elements may be reversed end-to-end if one end is damaged during a cutting operation. If an element becomes overly deteriorated, it is simply removed from the grid and replaced with another inexpensive section of copper tubing. Therefore, replacement of expensive burn bars or standards is eliminated and small sections of the burning table surface can be quickly repaired as necessary without undue expense.

The hopper-shaped tank terminates in a lower downwardly sloping vibrating trough which is supported from sloped tank panels by a plurality of resilient fasteners with a flexible seal extending between the panels and the trough. The lower end of the trough opens into a collection bin which has a wire mesh basket supported therein. Vibrators are connected to the panels on either side of the trough and are activated to move the slag into the wire basket. The basket with the slag contained therein may be easily retrieved from the collection bin.

These and other objects, features and advantages of the present invention will become apparent to those skilled in the art from the description which follows and from the drawings.

DESCRIPTION OF THE PREFERRED EMBODIMENT

Figure 1:
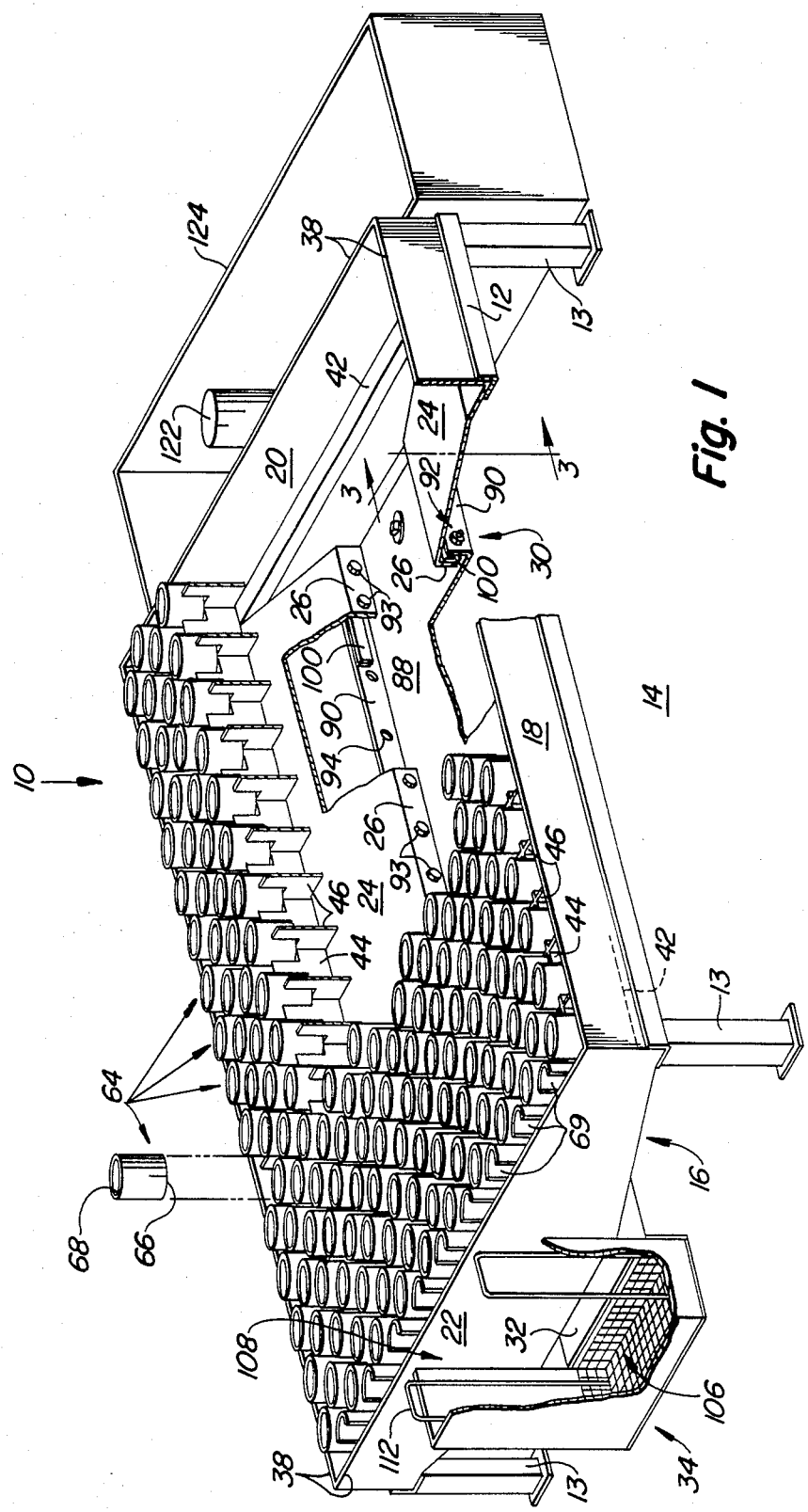
FIG. 1 is a perspective view, partially in section, showing a burning table constructed in accordance with the teachings of the present invention.
Figure 3:
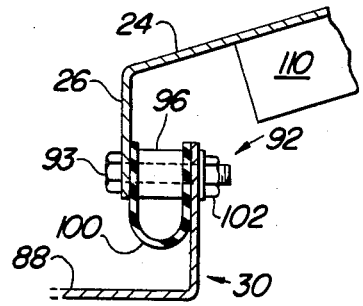
FIG. 3 is a view taken generally along lines 3—3 of FIG. 1 showing in detail the resilient trough-fastener assembly with the flexible seal.

A burning table, designated generally at 10 in FIG. 1, includes a supporting frame 12 with legs 13 resting on the work station floor 14. The frame 12 carries a generally hopper-shaped tank 16 having sidewalls 18 and end walls 20 and 22. The bottom of the tank 16 is defined in part by a pair of sloped panels 24 which converge downwardly and inwardly and terminate in upright flanges 26 extending the length of the tank. An elongated trough 30 is resiliently connected to the flanges 26 and slopes downwardly toward the end wall 22 to an opening 32 which opens into a slag collection bin 34. The trough 30 is spaced only a small distance above the floor and therefore the downward slope is quite small.

Figure 2:
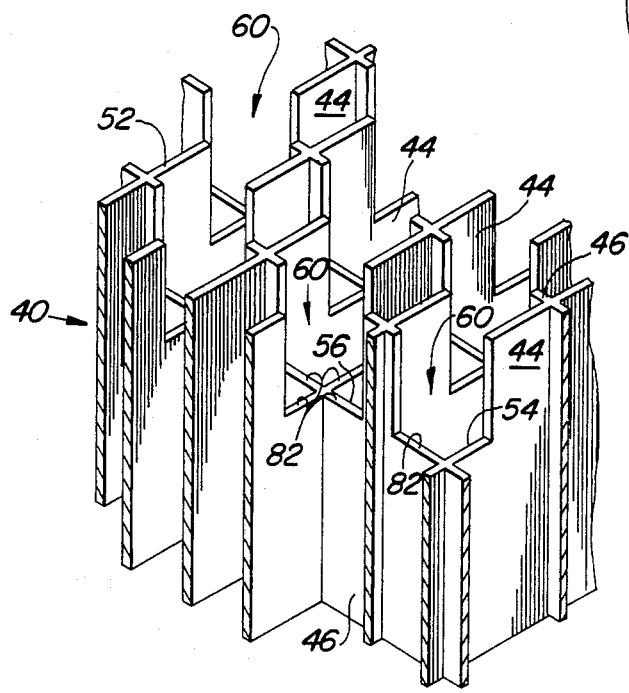
FIG. 2 is a perspective view of a portion of the element supporting grid with the elements removed from the supportive surface.

The sidewalls 18 and end walls 20 and 22 of the tank 16 terminate in a substantially horizontal edge 38. Horizontal load-bearing grid structure 40 is removably supported in freestanding fashion between the sidewalls 18 and end walls 20 and 22 by angles 42 which extend around the inside of the tank, or by other suitable supporting means. As best seen in FIG. 2, the grid structure 40 includes a plurality of first equally spaced bars 44 extending parallel to the length of the tank 16. Transversely extending connecting bars 46 are equally spaced and extend at right angles to the bars 44. The bars 44 and 46 are welded or otherwise suitably connected to each other so that, when viewed from the top, the grid structure 40 defines an open lattice with a plurality of equally spaced rectangular holes 48.

The top of the grid 40, indicated generally at 52 in FIG. 2, is supported slightly below the level of the horizontal edge 38. As best seen in FIG. 2, the bars 44 are notched at locations 54 and the connecting bars 46 are notched at corresponding locations 56 to form castellated or element-receiving areas as indicated generally at 60. The element-receiving areas 60 are uniformly spaced along the grid structure 40 at the alternating intersection points of the bars 44 and 46. The areas 60 therefore are aligned substantially along imaginary lines which extend at an angle of forty-five degrees with respect to the sidewalls 18. However, the grid 40 may be arranged in numerous other patterns which provide a somewhat closely spaced array of element-receiving areas 60.

A plurality of open tubular elements 64 in the shape of a right circular cylinder are received in the areas 60. Preferably the elements 64 are fabricated from copper tubing and include a bottom edge 66 which rests on the bottom of the area 60 and a top edge 68 which extends somewhat above the top 52 of the grid structure 40 and above the level of the horizontal tank edge 38. In the preferred embodiment, the axis of the element 64 is substantially vertical and intersects the juncture of the corresponding bars 44 and 46. The width of the notches 54 and 56 in the bars 44 and 46 are such that the element 64 fits snugly in the receiving area 60 but can be lifted therefrom for replacement or for reversal within the area. In the preferred embodiment, all the element-receiving areas 60 project downwardly substantially the same distance below water level and the copper elements 64 are all of equal height so that the top edges 68 of the elements define a horizontal work supporting area which projects slightly above the edges 38 of the tank 16. The diameter of the element 64 is chosen such that the smallest piece that will be supported on the burning table 10 will not fall into the element. The elements 64 are spaced on the grid structure 40 such that the area between four adjacent elements is approximately equal to the cross-sectional area of the elements 64. It has been found that elements 3" long cut from copper pipe of outer diameter ranging from 2" to 2⅝" work satisfactorily, with the preferred outer diameter of the pipe being approximately 2¼". The distance between intersections of the bars 44 and 46 is chosen to be slightly more than approximately two times the pipe diameter. If desired, additional elements 69 fabricated from elements 64 which are cut in half in the axial direction may be placed on the grid 40 at opposite edges of the tank as shown in FIG. 1 to provide more complete supportive structure adjacent the tank sides.

Figure 4:
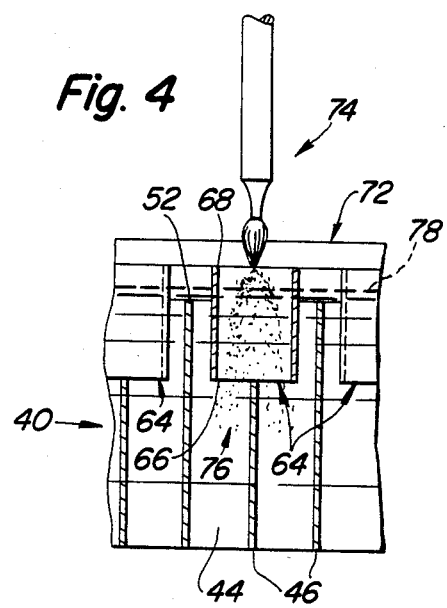
FIG. 4 is a view showing a torch cutting a metal workpiece with slag from the cutting operation entering the water.

For most cutting operations, the tank 16 is filled with water to a level just above the top of the grid 52 and slightly below the top edge of the elements 64. Preferably, the water level is approximately 1" below the top edge 68. The open lattice arrangement of the horizontal grid structure 40 permits free circulation of the water around both the inside and outside surfaces of the cylindrical elements 64. As best seen in FIG. 4, a metal workpiece 72 is supported on the top edges of the copper elements 64, and a torch 74 of conventional construction is moved along the workpiece to provide the desired cut. Slag, indicated generally at 76, quickly enters the water 78 so that pollution is minimized. The water 78, which is free to circulate in the open ended elements 64 and which is in constant contact with a substantial portion of both the inner and outer cylindrical surfaces of the element provides rapid cooling of the copper to prevent any substantial damage to the element even during slow cutting of a relatively thick workpiece. The notches 54 and 56 are centered on either side of the intersection points of the corresponding bars 44 and 46 so that water may circulate freely and slag 76 may fall freely through the center of the elements 64 and through any one of four equal area sections defined by the intersection of the bottom edge 66 with the upwardly facing ledges, indicated generally at 82 in FIG. 2, of the notched bars. The upright and inwardly facing edges of the notched areas, indicated generally at 84 in FIG. 2, are spaced such that the elements 64 are snugly received therebetween but can be lifted from the element-receiving area 60 if the top edge 68 becomes damaged. The elements 64 can simply be reversed end-for-end so that the edge 68 is inserted into the area 60 and rests upon the ledges 82 and the edge 66 becomes the material supportive portion of the element. The elements 64 are sufficiently long to provide good heat transfer between the copper and the water. Since the elements 64 are fabricated from relatively inexpensive, conventional copper tubing, manufacturing and replacement costs are kept to a minimum. Damaged sections of the supportive surface can be changed quickly and easily, and since the top of the grid 52 is normally maintained at or below water level, no damage occurs to the grid structure 40 during the cutting operation.

The trough 30 includes a substantially flat bottom surface 88 with upright flanges 90 extending upwardly from both edges substantially the entire length of the trough. The trough 30 is wider than the downwardly facing opening defined by the flanges 26 of the sloped panels 24. The flanges 90 extend outwardly of the corresponding flanges 26 and slightly above the lower edge of the flanges 26. The trough 30 is resiliently connected to the sloped panels 24 by a series of connecting assemblies 92 uniformly spaced at intervals of approximately 6" along the flanges. Each connecter assembly 92 includes a bolt 93 which passes through a hole in the flange 26 and through a corresponding hole 94 in the trough flange 90. A resilient spacer 96 extends over the bolt shank between the flanges 26 and 90, and a continuous, U-shaped seal 100 includes side legs supported between the ends of the spacers 96 and the flanges 26 and 90. A nut 102 is tightened on the bolt 94 to compress the side legs of the flexible seal 100 against the ends of the spacer 96. The upwardly opening trough 30 both seals the bottom of the water tank 16 and captures slag and other waste material that falls down through the support elements 64. The bottom surface 88 is sloped downwardly toward the slag collection bin 34 which contains a removable wire mesh basket 106. A vibrator 110 is connected to each of the sloped panels 24 to cause the slag to move down the panels into the trough 30. The vibrators 110 also cause the trough 30 to vibrate and move the slag down the shallow incline to the opening 32 and into the collection bin 34. The collection bin 34 opens upwardly at 108 above the level of the water in the tank, and basket handles 112 extend upwardly to the bin opening so that the operator can easily remove the slag-containing basket 106 from the bin. The entire slag removal operation can therefore be performed without complicated water flushing systems or complex movable parts.

A small water pump (not shown) is provided near the back of the tank for pumping a small portion of the water from the bottom of the tank to the top of the tank and causing enough circulation so that oxide powders and the like from the cutting operation will mix with the water to prevent the powders from floating on the surface.

The grid structure 40 is preferably fabricated from relatively narrow steel bars of approximately ¼" thickness so that the bottom portions of the cylindrical support elements 64 remain substantially open and allow slag to fall freely therethrough and water to circulate freely to cool the support elements 64. The open support element structure prevents blowback that would hinder the cutting operation. The tubing from which the elements 64 are fabricated has a relatively thin wall on the order of 1/16" thickness to also help reduce blowback problems. The entire grid structure 40 is freestanding on the angles 42 so it may be simply lifted from the table 10 to gain access to the lower portion of the tank 16. A sump pump 122 is provided for moving the water from the tank 16 to a holding tank 124 located at one end of the burning table 10. The water can be removed from the tank 16 without need of a floor drain or other liquid conveying structure. The pump 122 moves the water from the holding tank 124 back into the hopper-shaped tank 16 before cutting operation is resumed. A conventional ball-cock arrangement (not shown) may be provided to maintain the water level just below the top of the cylindrical support elements 64. For plasma arc cutting, the entire arrangement of support elements 64 may be flooded with water, in which case it is necessary to position the top edges 68 of the elements 64 below the level of the tank edges 38.

Having described the preferred embodiment, it will be apparent that modifications can be made without departing from the scope of the invention as defined in the accompanying claims.

I claim:

1. A burning table for supporting a workpiece during cutting, said table comprising:
   a water tank for providing a preselected water level;
   a horizontal grid supported substantially entirely below water level; and
   a plurality of individually replaceable tubular elements supported by the grid, each element including a lower end portion extending downwardly into the water and an upper end portion extending above the grid, the upper portions of the elements defining a generally horizontal workpiece support closely adjacent the level of the water.

2. The invention as set forth in claim 1 wherein the replaceable elements comprise upright and open-ended members slidably received by the grid.

3. The invention as set forth in claim 1 wherein the replaceable elements are fabricated from sections of copper tubing.

4. The invention as set forth in claim 1 wherein the replaceable elements are right circular cylinders and are reversible end-for-end in the grid so that either end portion may be selectively utilized to define the corresponding portion of the workpiece support.

5. The invention as set forth in claim 2 wherein the elements comprise an open ended cylinder, and wherein either end of cylinder may be selectively utilized for the supportive upper end portion.

6. The invention as set forth in claim 1 wherein the upper end portion extends above water level.

7. The invention as set forth in claim 1 wherein the grid comprises a plurality of first members, said first members extending generally horizontally in parallel spaced relationship, and a plurality of horizontally extending second members intersecting the first members at right angles, and means for supporting the elements adjacent the intersections of the first and second members.

8. The invention as set forth in claim 7 wherein elements comprise upright open cylinders and the axis of each cylinder passes through the intersection of the corresponding first and second members.

9. The invention as set forth in claim 7 wherein the first and second members are uniformly spaced, and the means for supporting the elements includes a vertically notched portion of the members.

10. The invention as set forth in claim 9 wherein the elements are cylinders and the first and second members are notched symmetrically with respect to said intersections for supporting the cylinders at uniformly spaced locations on the grid.

11. The invention as set forth in claim 10 wherein the cylinders are open at both of their ends and the open area of each of the upper portions of adjacent cylinders is approximately equal to the area between said adjacent cylinders, and wherein said open area is substantially less than the area of the smallest workpiece to be supported on support.

12. The invention as set forth in claim 8 wherein the grid includes an uppermost portion extending upwardly in the tank no higher than the water level, and wherein the cylinders extend above the water level a distance less than or equal to approximately 1".

13. The invention as set forth in claim 12 wherein the cylinders are fabricated from copper tubing of diameter between 2" and 3" and each cylinder is at least approximately 3" in length.

14. The invention as set forth in claim 1 further comprising a downwardly sloped trough opening upwardly toward the grid for receiving waste products which fall through the grid, means resiliently connecting the trough to the water tank, a collection bin supported at the lower end of the trough, and means for oscillating the trough to move the waste into the collection bin.

15. The invention as set forth in claim 14 wherein the collection bin includes a removable basket for selectively retrieving the waste from the bin.

16. The invention as set forth in claim 14 wherein the trough closes the lower portion of the water tank, and the means resiliently connecting includes a flexible seal extending between the tank and the trough.

17. A burning table for supporting a workpiece to be cut and for collecting waste material such as slag produced during cutting, said burning table comprising:
- a support frame;
- a water tank carried by the frame and having panel structure sloping downwardly toward a central location;
- workpiece supporting structure located near the top of the tank;
- an elongated upwardly opening trough;
- means for resiliently supporting the trough adjacent the central location and below the panel structure for receiving the slag with said trough sloping downwardly toward one end;
- a slag collection bin located at said one end; and
- means for oscillating the trough to move slag along the trough in the direction of said one end and into the bin.

18. The invention as set forth in claim 17 wherein the means for resiliently supporting the trough includes fluid-sealing means connected in fluid-sealing relationship between the lower portion of the panel structure and the trough.

19. The invention as set forth in claim 17 wherein the means for oscillating comprises a vibrator supported on the panel structure.

20. The invention as set forth in claim 18 wherein the means for oscillating is supported on the panel structure.

21. The invention as set forth in claim 18 wherein the water tank includes an opening located adjacent said one end of the trough, said collection bin supported adjacent said tank opening and including a removable mesh screen for lifting slag from the bin.

22. The invention as set forth in claim 18 wherein the trough includes an upwardly projecting flange and the panel structure includes downwardly projecting flange, said means for resiliently supporting comprising fastening means connecting the flanges and said sealing means comprising a U-shaped resilient strip having opposed side legs abutting the respective flanges.

23. The invention as set forth in claim 18 wherein the workpiece supporting structure comprises an open, load-bearing grid, numerous open ended tubular members supported vertically on the grid and extending upwardly from the grid, said tubular members including substantially horizontal upper edges defining a horizontal work surface, said workpiece supporting structure providing a generally unobstructed path between the workpiece and a portion of the tank below said supporting structure so that slag can gravitate through said supporting structure.

24. The invention as set forth in claim 23 wherein said tank is adapted for holding a preselected level of water, said table further comprising means for supporting the grid substantially entirely submerged in the water.

25. The invention as set forth in claim 24 wherein the upper edges of the tubular members project above the water.

26. The invention as set forth in claim 24 wherein the tubular members include lower portions in heat-sinking contact with the water.

27. The invention as set forth in claim 26 wherein the tubular members comprise sections of thin-walled copper tubing.

28. The invention as set forth in claim 27 wherein the tubing has a diameter on the order of $2\frac{1}{4}''$ and a wall thickness on the order of $1/16''$.

* * * * *